United States Patent Office 3,438,338
Patented Apr. 15, 1969

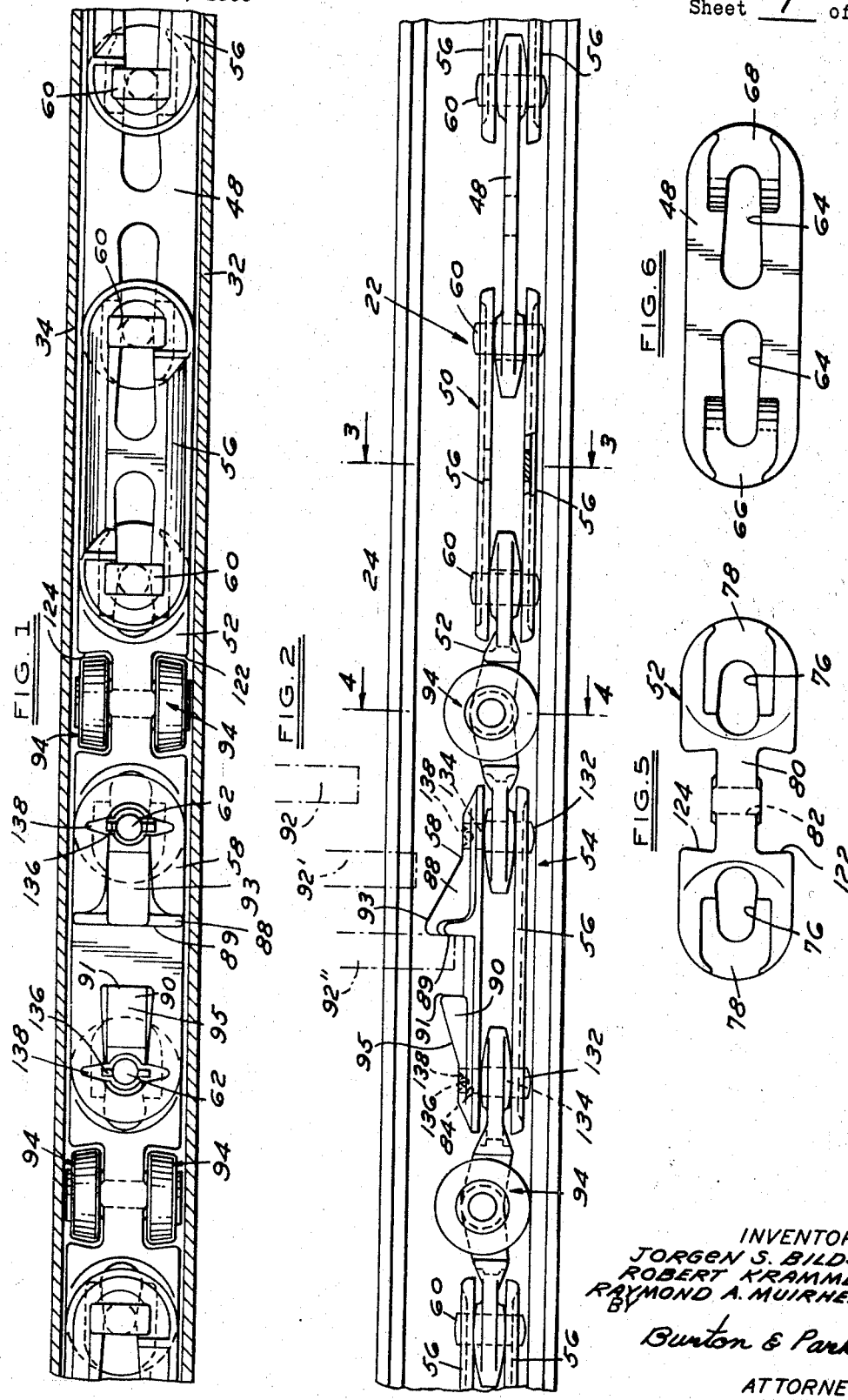

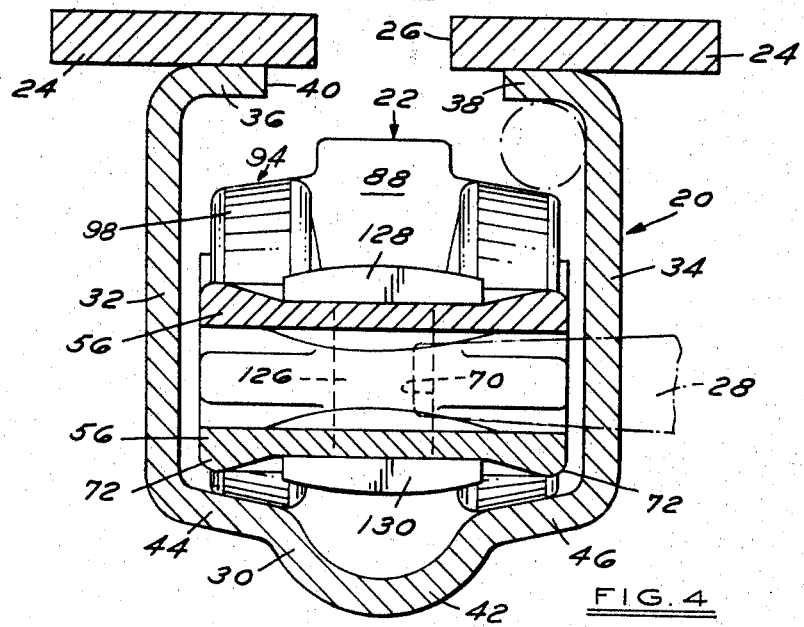
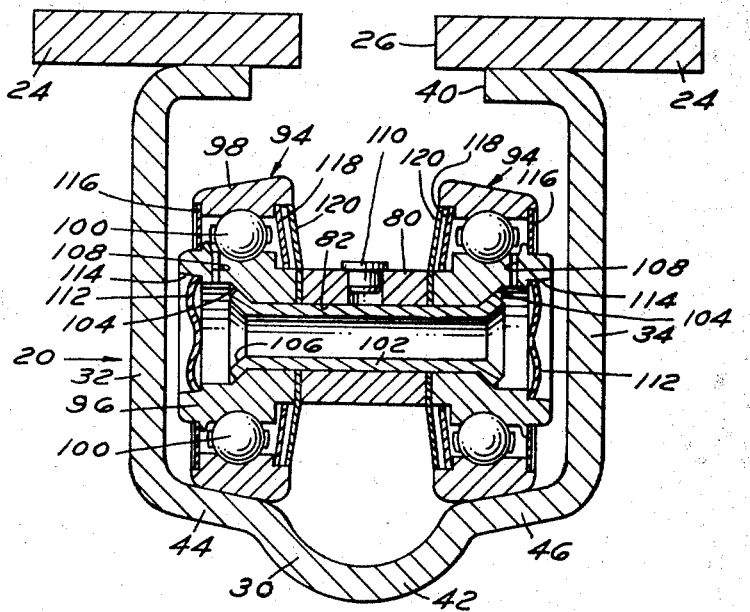
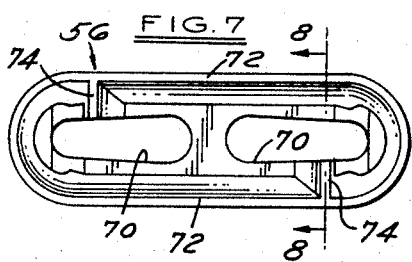
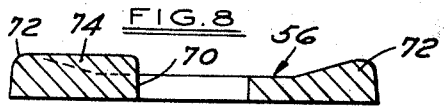

3,438,338
SUB-FLOOR CONVEYOR SYSTEM
Jorgen S. Bildsoe, Royal Oak, Robert Krammer, Detroit, and Raymond A. Muirhead, St. Clair Shores, Mich., assignors to Taylor & Gaskin, Inc., Detroit, Mich., a corporation of Michigan
Filed Dec. 9, 1966, Ser. No. 600,544
Int. Cl. B61b 13/12, 9/00; B61j 3/04
U.S. Cl. 104—172    6 Claims

ABSTRACT OF THE DISCLOSURE

A sub-floor conveyor system for propelling wheeled trucks having a depending tow pin, the system being of such compact design as to enable its installation in structures not specifically intended to accommodate such a system. The system includes a track of generally rectangular cross section for disposal under the floor, and a continuous drive chain positioned within the track to be driven therealong by suitable motive means, the chain comprised of a series of links having similar overall dimensions and configurations, certain of the links being provided with integral driving dogs engageable with the depending tow pins on the trucks, and certain other links having wheel mounting means wherein track-riding wheels are mounted on the links within recesses so that the wheels lie substantially laterally within the marginal edges of the links.

---

This invention relates to a sub-floor conveyor line system wherein wheeled trucks or the like may be propelled along the floor by engagement of a tow pin on the truck projecting into engagement with a driving dog on the conveyor. More particularly, it relates to a new and novel track and drive chain structure for such a system.

While the prior art devices have received wide usage and acceptance, each has characteristics which prevent its adaptability to certain installations. As an example, the space requirement for the conveyor itself, i.e., the distance below floor level that the conveyor projects, has curtailed its use where the floor has not been specifically designed to accommodate the installation.

It is therefore a general object of the invention to provide a sub-floor conveyor of simple and sturdy construction and of very compact design so as to take up a minimum of space beneath the floor level, thus permitting its use in existing structures not expressly designed to accommodate a conveyor system, and also to provide a system comprising few parts. An outstanding feature of the conveyor is that the track thereof which is embedded in the building floor may be formed in one piece sections from sheet steel or the like. Another meritorious feature resides in the provision of an articulated drive chain the links of which are easily disconnectible without tools, enabling quick replacement of damaged or broken links, and thus eliminating costly "down time" of the system.

Another object is the provision of such a system wherein the drive chain includes idler links carrying wheels to ride the track, the wheels being positioned in link recesses to provide a very compact structure which is supported on its wheels for rolling traverse of the track, rather than sliding, as in some of the prior art compact systems. An outstanding advantage of the structure disclosed herein is that it provides more clearance above the drive chain for installation of auxiliary equipment, while at the same time cutting the total depth requirement for the entire installation approximately in half.

A further object is the provision in a conveyor of the character described of a drive chain the links of which are so designed as to contact the track only in areas remote from the wheel riding track surface in the event of wear or sag occurring in the chain.

Another object is the provision of such a system including a drive chain having wheels positioned in chain link recesses, wherein each wheel comprises a stationary inner race projecting slightly axially beyond a rotating outer race, whereby the rotating wheel portion cannot contact the track side walls even when negotiating turns in the track. With the provision of upright rollers in the track side walls at the turns, the drive chain is able to negotiate turns without binding.

Other objects, advantages, and meritorious features will more fully appear from the following specification, claims and accompanying drawings, wherein:

FIG. 1 is a top elevation of a sub-floor conveyor with portions of the conveyor track removed to show the drive chain in detail;

FIG. 2 is a side elevation of the conveyor shown in FIG. 1;

FIGS. 3 and 4 are enlarged cross sections taken along the lines 3—3 and 4—4 respectively of FIG. 2 showing details of drive chain construction;

FIG. 5 is a plan view of a wheel-carrying drive chain link with the wheels removed;

FIG. 6 is a plan view of a center link of the drive chain;

FIG. 7 is a plan view of a side link of the drive chain; and

FIG. 8 is a cross section taken along line 8—8 of FIG. 7.

Referring with more particularity to the drawings, there is shown a conveyor embodying the invention comprising a track 20 and a drive chain 22. Track 20 is adapted to be embedded in a concrete floor or the like having a pair of parallel, spaced-apart floor plates 24 defining therebetween a tow slot 26, in a well-known manner. Chain 22 is a continuous chain, only a portion of which is shown, and is positioned within track 20 to be urged therealong by a drive, such as a conventional caterpillar drive, an arm of which is shown in phantom outline at 28 in FIG. 3 in driving engagement with the chain 22. As the particular drive means forms no part of the instant invention, it will not be described in detail, and it is to be understood that any suitable drive may be employed.

Track 20 is of generally square or rectangular cross section, and may be of one-piece construction, eliminating the necessity of securing parts together and greatly simplifying the manufacture of the track. It may be constructed out of sheet steel or the like, and includes a bottom wall 30, two generally vertical side walls 32 and 34, and a pair of inwardly projecting top flange portions 36 and 38 which are spaced apart to define an opening 40 aligned with floor slot 26. Bottom wall 30 of the track is preferably provided with a dished central portion 42 joined to the side walls by inclined portions 44 and 46. As can be seen from an examination of FIGS. 3 and 4, the portion 42 of the track provides a depressed track area so that any foreign matter or debris that may happen to fall into the track through slot 26 will not interfere with conveyor operation. Alternatively, the track may be constructed eliminating the top flange portions 36 and 38, with the side walls 32 and 34 being welded at their upper ends directly to the bottom of the plates 24.

Drive chain 22 includes a series of links releasably secured together to provide a strong chain of simple construction. The chain in general comprises rigid link members which are provided adjacent each opposite end with aperture means through which project locking pins securing adjacent links together to form a continuous chain. The links are pivotable about the pins to enable the chain to negotiate curves in the track, and some vertical relative movement of the links is also possible, to provide complete flexibility of operation.

Referring to FIGS. 1 and 2 particularly, the drive chain 22 comprises center links 48, connecting links 50, idler links 52 and driving links 54. Each connecting link 50 includes a pair of identical side link members 56, while each drive link 54 includes an upper dog link member 58 and a lower side link member 56, the latter being identical to the members 56 of the connecting link. Pins 60 of generally H-shape project through the ends of the link members securing the links together, except in the case of the drive links 54, which are secured to the idler links 52 by a T-shaped pin 62, as more fully set forth hereinbelow.

The construction of center links 48 is shown in plan in FIG. 6, wherein it can be seen that the link is oblong, having rounded ends and a pair of spaced-apart, elongate apertures 64 opening therethrough, each aperture tapering slightly toward the link end. Opposite end portions 66 and 68 of link 48 are thickened to provide contact surfaces for adjacent links coupled thereto.

FIGS. 7 and 8 show one of the side link members 56, two of which are provided for each connecting link 50. Each member 56 has a pair of elongate tapered apertures 70 therethrough similar to apertures 64 in member 48, and the peripheral upper marginal edge of the member 56 is thickened to provide a smooth rail 72. Spaced from the smaller end of each aperture 70 and extending generally perpendicular to the aperture axis, is an upstanding integral stop 74. In each member the stops 74 are diametrically opposite each other, as shown in FIG. 7.

Each idler or wheel-carrying link 52 shown in FIG. 5 is likewise provided with a pair of tapered apertures 76, and the central end portions 78 of member 52 are of increased thickness, corresponding to the portions 66 of link 48. Midway of its length, member 52 is provided with opposed cut-outs to provide an upstanding central web 80 intermediate opposite ends. Web 80 exhibits a transverse cylindrical aperture 82 extending transversely therethrough for reception of a wheel-supporting shaft to be described.

The drive link member or pusher dog 58 is of one-piece construction, and is of generally similar outline to the other link members 48, 52 and 56. It is provided with a pair of circular apertures 84 spaced from opposite ends thereof, and its upper surface has a groove 86 extending diametrically across each aperture 84 and having opposite end portions blending into the member body. Upstanding from member 58 in spaced-apart relation are a primary driving dog 88 and a secondary driving dog 90, each of which is provided with a vertical drive face shown at 89 and 91 respectively, and an inclined upper surface, shown at 93 and 95 respectively.

Shown in phantom in FIG. 2 is a tow pin 92 of a load-carrying truck, the pin being selectively vertically shiftable into floor slot 26 for engagement with the driving dogs on the drive chain. The direction of chain travel is from the right to the left in FIGS. 1 and 2. In its lowered position, pin 92 abuts dog 88, and the associated truck is propelled along the floor as the chain moves through the track.

Upon each link 52 are mounted a pair of trolley wheels 94, each of which comprises an inner stationary race 96 and an outer rotatable race 98, with ball bearings 100 interposed therebetween. A hollow shaft 102 projects through the inner races of each pair of wheels, which are provided with flared apertures 104, and shaft 102 is swaged as at 106 to retain the wheels on the link web 80. Lubrication is supplied to the wheel bearings through an aperture in web 80 and hollow shaft 102, and an aperture 108 in each inner race 96. A plug 110 closes the aperture in the web against the entry of dirt or other foreign matter.

Opposite ends of the hollow shaft 102 are provided with seals 112 which are snapped into counterbores 114 in the extremities of members 96. Annular dust covers 116 and 118 are also provided in each wheel to enclose the ball bearings 100 and are positioned in shallow undercuts in the races 96 and 98. In addition another cover 120 is provided on the inwardly facing side of each wheel encircling the shaft 102 and gripped between the web 80 and the inner wheel race 96. The cover 120 is thus held stationary with respect to the rotating outer wheel race 98, thereby eliminating any interference with wheel rotation by stringy material becoming wound between the wheel and its axle, as is the case with prior wheel designs.

From FIGS. 3 and 4 it can be seen that each wheel 94 is tapered conforming to the inclination of the track bottom portions 44 and 46. Rolling contact between the tapered wheels and inclined track surfaces assists in maintaining the drive chain 22 riding along the centerline of the track, and in addition, any foreign matter that might enter the track through floor slot 26 will slide into the dished track portion 42 out of the path of the trolley wheels. Referring to FIGS. 1 and 5, each idler link 52 carrying a pair of trolley wheels is shaped as at 122 and 124 to closely embrace the wheels. This construction prevents as far as possible entry of any objects between the wheel and the link which might impede or prevent wheel rotation.

For connecting the various links together there are provided pins 60 and 62, the former shown quite clearly in FIG. 3 as having a shank 126 and opposite head portions 128 and 130 extending transversely across the shank. Head portions 128 and 130 are sized to be receivable through the link apertures, that is apertures 64 in link 48, 70 in link 56 and 76 in link 52, when positioned extending longitudinally thereof, but overlying opposite marginal edges when positioned transversely of the link. To secure the links together, the pin 60 is merely inserted through the appropriate link aperture, and the link rotated 90 degrees with respect to the pin, or vice versa, positioning the pin heads 128 and 130 transversely of the link aperture.

The pins 62 which are employed to connect each driving link 54 to its adjacent idler links 52 are of inverted T-shape, having a head 132 and shank 134, with the shank provided with an aperture for reception of a short peg 136. The pins 62 are merely inserted upwardly through the apertures in link members 54, 52 and 58, and then peg 136 slipped through the pin aperture to secure the links together. Each dog link member 58 is provided with grooves 138 extending across an aperture therein through which a pin 62 projects, and as each groove tapers upwardly at its opposite ends, the peg 136 is effectively retained in position, yet is easily removable when desired.

With the chain links assembled into a continuous chain and positioned in the track 20, the chain may be propelled along the track by any suitable means, as aforesaid, a portion of a well-known "caterpillar" drive being shown at 28 in FIG. 3. The track 20 is embedded in the floor, with the plates 24 disposed with their upper surfaces level with the floor surface. With the track and chain construction shown and described, the lowermost part of the track shown at 42 (FIGS. 3 and 4) projects less than 4½ inches below the floor line, whereas in conventional prior art sub-floor conveyor systems, approximately 9 inches of space below the floor line is required for the track. While the total depth requirement for the conveyor is only one-half that of conventional systems, the distance from floor level to the top of the driving dogs 88 is appreciably greater than with such conventitonal systems. There is thus provided more clearance above the chain for installation of auxiliary equipment such as tow pin limit actuators, dog spotters, etc., in spite of the fact that the total space requirements have been cut in half. The novel design characteristics of our new system not only greatly simplify installation in new buildings, but also make possible the installation of a sub-floor conveyor in existing buildings which could not structurally accommodate prior art systems.

As the load-carrying trucks which the conveyor is adapted to handle are well known in the art, they have not been shown in the drawings. It is standard practice in the industry to utilize trucks having a vertically shiftable tow pin mounted thereon, together with mechanism for retaining the pin in a plurality of vertically spaced positions. In FIG. 2 there is shown in phantom a tow pin in three different positions at 92, 92', and 92". In the fully raised position 92, the lower end of the tow pin is spaced above the floor line, and the truck may be freely wheeled along the floor manually. In the intermediate position shown at 92', the pin is engaged within the floor slot 26 (FIG. 3), but is not engaged by the drive chain. In its lowermost position, shown at 92", the pin is in driving engagement with the dog 88.

The direction of chain movement is from right to left in FIG. 2, and as the link 54 approaches a stationary truck with its tow pin 92" in the down position, the tow pin will ride along the inclined upper surface of dog 90 and will drop in front of the dog 88. The pin is then effectively trapped between the two dogs, and the truck on which the pin is mounted will be propelled along the floor by engagement of the pin with drive face 89 on dog 88. The truck cannot "run away" from the chain, as for example on a downgrade, because the drive face 91 on dog 90 will abut pin 92" if the truck tends to accelerate out of driving engagement with dog 88. Conversely, if the truck with its tow pin in the down position as at 92" is moving from right to left faster than the drive chain, the tow pin will ride up the inclined face 93 of dog 88, and will still become entrapped between the two dogs, as it will drop into engagement with drive face 95 of dog 90. Thus a truck with its pin in the down or driving position will always be picked up by the driving dogs on the chain irrespective of its direction of approach.

There is thus shown and described a sub-floor conveyor system incorporating many advantages over prior systems in present use. One most important attribute of the system is that it requires much less space below floor level for its installation. Moreover, the construction of the track is exceedingly simple, each length being made of a single formed piece of sheet metal or the like. The chain links are likewise of simple construction, with the added advantage that any link member may be conveniently removed and replaced without dismantling the remaining links of the chain and without the use of special tools.

As the chain is subject to wear over extended periods of use, it has been designed to provide continuous satisfactory service even under extreme conditions. All of the above-described features of construction contribute to long chain life without expensive maintenance. The particular construction of link members 52 and wheels 94 cooperate to insure that the rotating outer race 98 of the wheel does not contact the sides 32 and 34 of the track, which could cause damage to both wheels and track. Furthermore, as most clearly evident from FIG. 3, the link members such as 56 shown therein are each provided with smooth rail portions 72 extending along opposite marginal edges thereof. It is conceivable that after long usage the chain will wear enough so that the underside of lower link member 56 (FIG. 3) will contact track portions 44 and 46, along which the wheels 94 ride. However, it is evident that the smooth rails 72 lie spaced laterally from the wheel portions which contact the track, and therefore even if the track surface is marred or worn by the links rubbing thereagainst, the wheel contact area of the track will not be damaged.

What is claimed is:

1. A sub-floor conveyor for moving trucks along a floor comprising a track of generally rectangular cross section disposed below floor level and having an open slot in the top of the track, a continuous drive chain positioned in the track for movement therein including interconnected idler links, drive links and connecting links each having generally rectangular link portions extending laterally of the track, said drive links provided with an integral upstanding driving dog portion for engagement with a driving member on a truck projecting through said open track slot, and said idler links having an upstanding central web portion apertured to define a shaft support with opposite ends of the link projecting laterally beyond said web portion to provide wheel recesses, a shaft supported in said web aperture, trolley wheels journaled for rotation on opposite ends of said shaft to ride said track, each wheel being embraceably positioned within a wheel recess of the link, and motive means for propelling the drive chain along said track.

2. The invention as defined in claim 1 characterized in that each drive link is provided with a pair of integral driving dog portions each having a substantially vertical driving face for engagement with a driving member on a truck, said driving faces being disposed in spaced apart aligned confrontation on said drive link.

3. The invention as defined in claim 2 characterized in that each of said driving dogs on said drive links comprises a generally vertical driving face extending transversely of the link for engagement with a driving member on a truck, and an upwardly incline ramp spaced longitudinally forwardly of said vertical face.

4. The invention as defined in claim 1 characterized in that said trolley wheels each comprises a stationary inner race and a rotating outer race, with the inner race projecting axially beyond said outer race, the projecting face of the inner race terminating substantially aligned with the marginal edge of the idler link member.

5. The invention as defined in claim 1 characterized in that said track comprises a single piece sheet metal member in cross section having generally vertical side walls and a bottom wall exhibiting inclined wheel riding portions adjacent said side walls, and said trolley wheels each having track engaging surfaces inclined correspondingly to the wheel riding portions of the track bottom wall.

6. A sub-floor conveyor for moving trucks along a floor comprising a track of generally rectangular cross section disposed below floor level having vertical side walls and inwardly projecting top wall portions spaced apart to define a slot therebetween and downwardly inclined bottom wall portions forming wheel riding surfaces, a continuous drive chain in said track movable therealong having a series of chain links pivotally connected together adjacent their opposite ends, alternate links including a pair of spaced superimposed link members of generally rectangular shape and the remaining links each comprising a single link member having its opposite ends interleaved between the link members of said alternate links, pin means extending through opposite ends of each link member pivotally coupling the links together, at least some of said remaining single member links including an integral upstanding web portion intermediate opposite ends thereof, said web exhibiting a transverse aperture having a shaft supported therein, a trolley wheel mounted on each end of said shaft, said opposite ends of the link projecting laterally beyond the web on opposite sides thereof to define recesses closely embracing said trolley wheels, with the wheel axes being positioned intermediate the planes defined by the superimposed link members of alternate links.

References Cited

UNITED STATES PATENTS

| 2,621,610 | 12/1952 | Boyko | 104—172 |
| 3,006,456 | 10/1961 | Ferris | 104—172 X |

ARTHUR L. LA POINT, *Primary Eaxminer.*

DANIEL F. WORTH III, *Assistant Examiner.*

U.S. Cl. X.R.

104—178